(12) United States Patent
Zeng et al.

(10) Patent No.: US 9,240,740 B2
(45) Date of Patent: Jan. 19, 2016

(54) ACTIVE VOLTAGE CONTROLLER FOR AN ELECTRIC MOTOR

(71) Applicant: The Boeing Company, Chicago, IL (US)

(72) Inventors: Peng Zeng, Newcastle, WA (US); Christopher Pete Benson, Renton, WA (US); Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 176 days.

(21) Appl. No.: 13/905,392

(22) Filed: May 30, 2013

(65) Prior Publication Data

US 2014/0354199 A1 Dec. 4, 2014

(51) Int. Cl.
| | |
|---|---|
| *G05B 11/28* | (2006.01) |
| *H02P 6/08* | (2006.01) |
| *H02P 7/29* | (2006.01) |
| *H02P 21/00* | (2006.01) |

(52) U.S. Cl.
CPC .. *H02P 6/08* (2013.01); *H02P 7/29* (2013.01); *H02P 21/0085* (2013.01)

(58) Field of Classification Search
CPC ............... H02P 1/00; H02P 6/08; H02P 7/29; G05B 11/28
USPC .......... 318/599, 811, 400.01, 400.02, 400.14, 318/400.15, 721, 799, 432; 388/800, 811, 388/819, 804, 829
See application file for complete search history.

(56) References Cited

U.S. PATENT DOCUMENTS

| | | | |
|---|---|---|---|
| 4,368,411 A | 1/1983 | Kidd | |
| 4,528,486 A | 7/1985 | Flaig et al. | |
| 6,700,342 B2 * | 3/2004 | Hampo et al. | 318/432 |
| 8,067,915 B2 * | 11/2011 | Hooker et al. | 318/466 |
| 8,405,337 B2 * | 3/2013 | Gebhart et al. | 318/445 |
| 8,511,606 B1 | 8/2013 | Lutke et al. | |
| 8,760,103 B2 * | 6/2014 | Bokusky et al. | 318/563 |
| 8,884,562 B1 | 11/2014 | Cameron | |
| 2002/0146617 A1 | 10/2002 | Johnson et al. | |
| 2003/0137269 A1 * | 7/2003 | Mir et al. | 318/599 |
| 2005/0179463 A1 | 8/2005 | Kasuya et al. | |
| 2008/0275644 A1 | 11/2008 | Macneille et al. | |
| 2013/0069572 A1 * | 3/2013 | Maekawa | 318/400.14 |

FOREIGN PATENT DOCUMENTS

| | | |
|---|---|---|
| EP | 0596472 A2 | 5/1994 |
| WO | WO2011149544 A1 | 12/2011 |
| WO | WO2014165502 A1 | 10/2014 |

OTHER PUBLICATIONS

International Search Report and Written Opinion, dated Jul. 22, 2014, regarding Application No. PCT/US2014/033532, 15 pages.
Cameron, "Current Control in Brushless DC Motors," U.S. Appl. No. 13/303,673, filed Nov. 23, 2011, 43 pages.

(Continued)

*Primary Examiner* — Antony M Paul
(74) *Attorney, Agent, or Firm* — Yee & Associates, P.C.

(57) ABSTRACT

A method for controlling an electric motor. A desired speed is identified for the electric motor during operation of the electric motor. A voltage is identified to cause the electric motor to turn at the desired speed. The voltage is applied to the electric motor and actively controlled during operation of the electric motor.

20 Claims, 9 Drawing Sheets

(56) References Cited

OTHER PUBLICATIONS

"Speed Software," CD-Adapco, Nov. 15, 2011, 4 pages, accessed May 30, 2013, http://web.archive.org/web/20111120100427/http://www.speedlab.co.uk/software.html.

"TG100H BLDC Inductor Board," ThinGap Corporation, May 24, 2007, 1 page, accessed May 30, 2013, http://www.thingap.com/pdf/2011/tg100hbldcindboard.pdf.

Cameron, "Quadrang Change Control in Brushless DC Motors," U.S. Appl. No. 13/933,803, filed Jul. 2, 2013, 82 pages.

International Search Report and Written Opinion, dated Jan. 14, 2015, regarding Application No. PCT/US2014/045048, 20 pages.

Partial International Search Report, dated Oct. 9, 2014, regarding Application No. PCT/US2014/045045, 7 pages.

Jojo, "SCR Applications," Electronic Circuits and Diagram-Electronics Projects and Design. Sep. 15, 2009, 6 pages. http://www.circuitstoday.com/scr-applications.

Extended European Search Report, dated Mar. 20, 2015, regarding Application No. 14190508.3, 8 pages.

\* cited by examiner

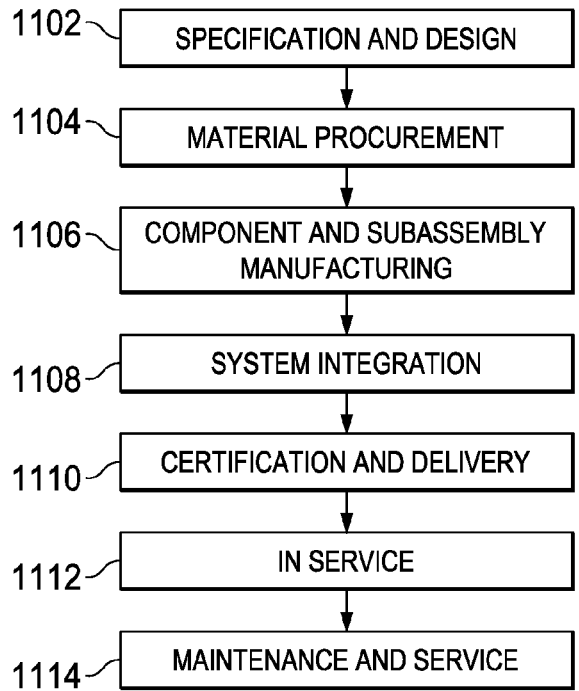
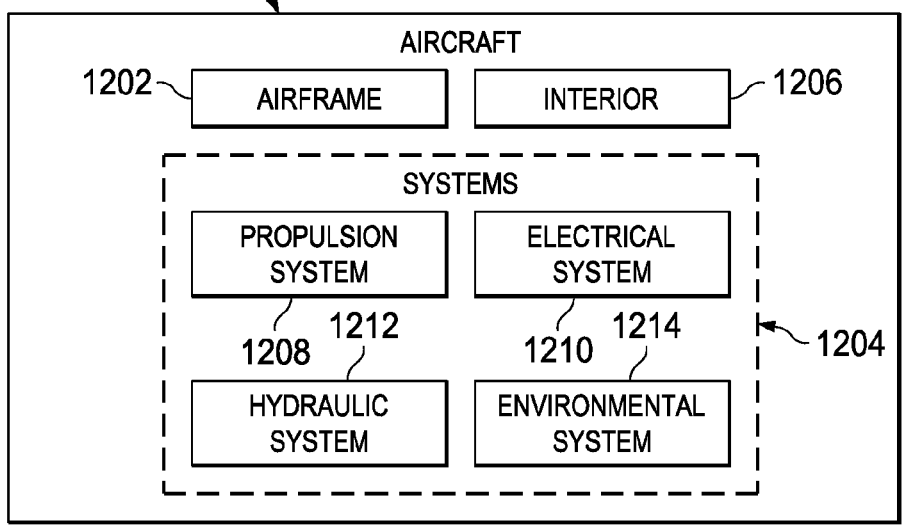

ACTIVE VOLTAGE CONTROLLER FOR AN ELECTRIC MOTOR

BACKGROUND INFORMATION

1. Field

The present disclosure relates generally to electric motor systems and, in particular, to controlling electric motor systems. Still more particularly, the present disclosure relates to a method and apparatus for controlling the operation of an electric motor in an electric motor system.

2. Background

An electric motor is a device that converts electrical power into mechanical power. Electric motors are used for various applications. These applications include fans, pumps, tools, disk drives, drills, and other types of devices that may be found in these and other types of platforms.

An electric brushless motor is a commonly used type of electric motor. With electric brushless motors, a controller is configured to change the current in windings in the electric motor. In particular, the current is switched at a frequency that changes the amplitude of the current applied to the windings in phases in a manner that causes the motor to turn. The switching of the current is performed using switches in the form of transistors.

Parameters such as torque and speed may be controlled in an electric motor. These parameters may be controlled by altering the duty cycle. The duty cycle is the percent of time that an object spends in an active state as a fraction of the total time that is considered. With respect to electric motors, the duty cycle may be defined as the ratio between the pulse and the period of a rectangular wave form.

For example, a duty cycle of 0 percent may be no torque. The duty cycle of 100 percent may be a maximum torque that can be generated by the electric motor. The efficiency of the motor is highest when the duty cycle is 100 percent.

However, when the duty cycle is 100 percent, the controllability of the electric motor is reduced. In particular, the control of maintaining the speed of the motor a particular number of revolutions per minute (RPM) may be limited. For example, if the desired operation of the electric motor is a speed of 6000 RPM, a duty cycle of 100 percent may be used to operate the electric motor at the speed of 6000 RPMs in this example.

However, increasing the speed beyond 6000 RPMs is not possible when the duty cycle is already 100 percent. Further, if the load applied to the motor reduces the speed below 6000 RPMs, the speed cannot be returned to 6000 RPMs by increasing the duty cycle since the duty cycle is already at 100 percent. As a result, the controllability of the electric motor is not as great as desired when the duty cycle is 100 percent.

Therefore, it would be desirable to have a method and apparatus that take into account at least some of the issues discussed above, as well as other possible issues.

SUMMARY

In one illustrative embodiment, an apparatus comprises a controller configured to identify a desired speed for an electric motor during operation of the electric motor. The controller is further configured to identify a voltage to cause the electric motor to turn at the desired speed. The controller is still further configured to apply the voltage to the electric motor during operation of the electric motor.

In another illustrative embodiment, an electric motor system comprises an electric motor and a controller. The controller is configured to identify a desired speed for the electric motor during operation of the electric motor. The controller is further configured to identify a voltage to cause the electric motor to turn at the desired speed with a duty cycle of about 100 percent using a group of control laws. The controller is still further configured to apply the voltage to the electric motor during operation of the electric motor with a desired duty cycle through a voltage regulator circuit.

In yet another illustrative embodiment, a method for controlling an electric motor is presented. A desired speed is identified for the electric motor during operation of the electric motor. A voltage is identified to cause the electric motor to turn at the desired speed. The voltage is applied to the electric motor during operation of the electric motor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of an aircraft manufacturing and service method in the form of a block diagram in accordance with an illustrative embodiment; and FIG. 12 is an illustration of an aircraft in the form of a block diagram in which an illustrative embodiment may be implemented.

DETAILED DESCRIPTION

The illustrative embodiments recognize and take into account that the controllability of the electric motor may be maintained even at a duty cycle of 100 percent. The illustrative embodiments recognize and take into account that changing the voltage applied to the electric motor may be used to control parameters such as speed and torque.

The illustrative embodiments recognize and take into account that the duty cycle may be maintained at about 100 percent or at some other level. The electric motor may be maintained at a desired speed through changing the voltage applied to the electric motor. The illustrative embodiments recognize and take into account that the controller may be used to change the voltage and manner such that a desired speed may be maintained during operation of the electric motor.

In one illustrative embodiment, a desired speed may be identified for the electric motor during operation of the electric motor. The voltage may be identified to cause the electric motor to turn at the desired speed. The voltage may be applied to the electric motor during the operation of the electric motor.

Figure 1:
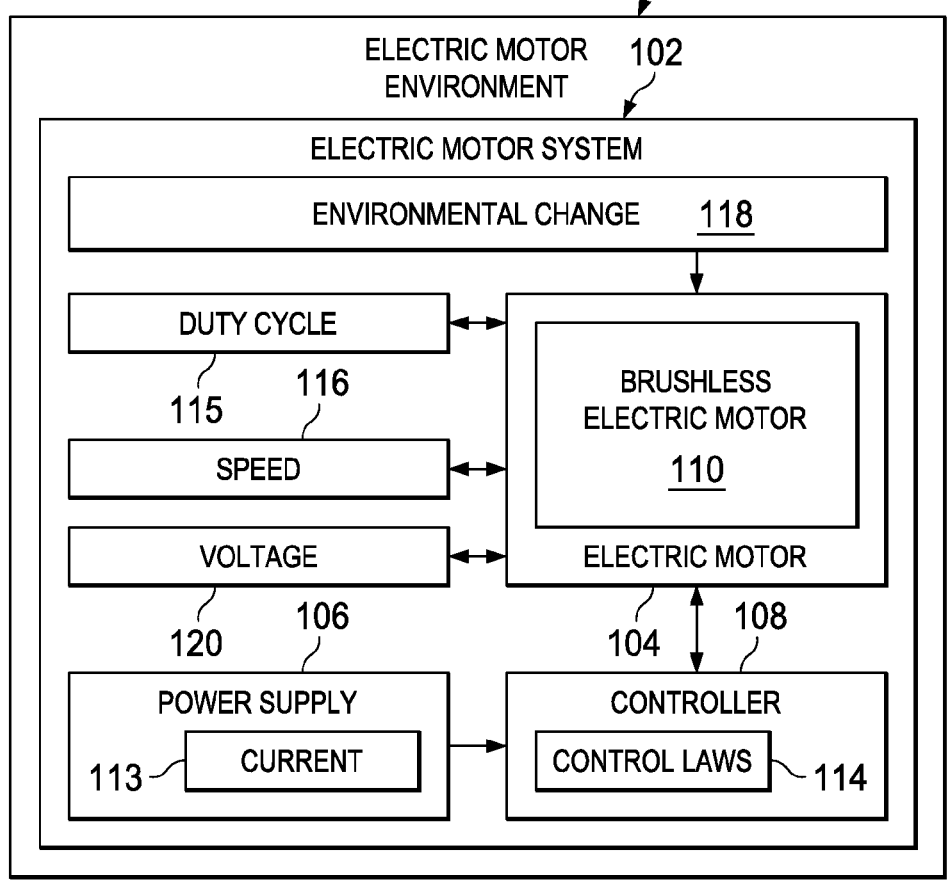
FIG. 1 is an illustration of an electric motor environment in the form of a block diagram in accordance with an illustrative embodiment.

With reference now to the figures and, in particular, with reference to FIG. 1, an illustration of an electric motor environment is depicted in the form of a block diagram in accordance with an illustrative embodiment. Electric motor environment 100 is an example of an environment in which an illustrative embodiment may be implemented.

Electric motor system 102 in electric motor environment 100 includes a number of different components. As depicted, electric motor system 102 includes electric motor 104, power supply 106, and controller 108.

Electric motor 104 is configured to generate rotary or linear torque or force. In these illustrative examples, electric motor 104 takes the form of brushless electric motor 110.

Power supply 106 supplies current to electric motor 104 through controller 108. Power supply 106 may take various forms. For example, power supply 106 may be selected from at least one of a battery, a power supply unit that converts alternating current to direct current, an electric generator, or some other suitable component.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Controller 108 is a hardware device in these illustrative examples. Controller 108 may include software. The hardware may include circuits that operate to perform the operations in controller 108. In this illustrative example, controller 108 may take the form of an impulse width modulation controller (IWMC) that modulates a switching frequency used to drive switches in the form of transistors that control current 113 sent to electric motor 104.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, control laws 114 are present in controller 108. Control laws 114 are processes, functions, or some other mechanism configured to control the operation of electric motor 104. As depicted, control laws 114 may be implemented in hardware, software, or some combination of the two.

A group of control laws 114 may be used to control operation of electric motor 104 in a desired manner. A "group of," as used herein with reference to items, means one or more items. For example, a group of control laws 114 is one or more control laws in control laws 114.

In this illustrative example, the group of control laws 114 may be used to maintain duty cycle 115 for electric motor 104 at about 100 percent or at some desired duty cycle other than 100 percent depending on implementation.

For example, speed 116 may be set or maintained by group of control laws 114 with duty cycle 115 at about 100 percent. Speed 116 may be maintained even when environmental change 118 may cause speed 116 to change.

For example, environmental change 118 may be a change in loading on electric motor 104. For example, electric motor 104 may be used to power objects such as a car. In this example, if the wind force against the car increases while the car is traveling at a constant speed, electric motor 104 increases the power to maintain speed 116 at the same level. This change in loading may increase or decrease speed 116. When the decrease in speed 116 occurs, the group of control laws 114 may return speed 116 to the desired level even though duty cycle 115 may be about 100 percent.

In these illustrative examples, speed 116 may be maintained at the desired level through changing the voltage 120 applied to electric motor 104. In this manner, duty cycle 115 may be maintained at a desired level, such as about 100 percent.

In this manner, group of control laws 114 may provide a desired level of controllability for electric motor 104. In these examples, the efficiency may be in terms of power efficiency. In other words, the electrical power input into electric motor 104 is compared to the mechanical power generated by electric motor 104.

In the illustrative examples, efficiency may be described as follows:

$$\text{Efficiency} = \frac{P_{out}}{P_{in}} = \frac{\omega\tau}{IV}$$

$$\text{Duty Cycle} \propto \frac{1}{V}$$

where $P_{in}$=input power, $P_{out}$=output power, $\omega$=speed, $\tau$=torque, I=current, and V=voltage.

Figure 2:
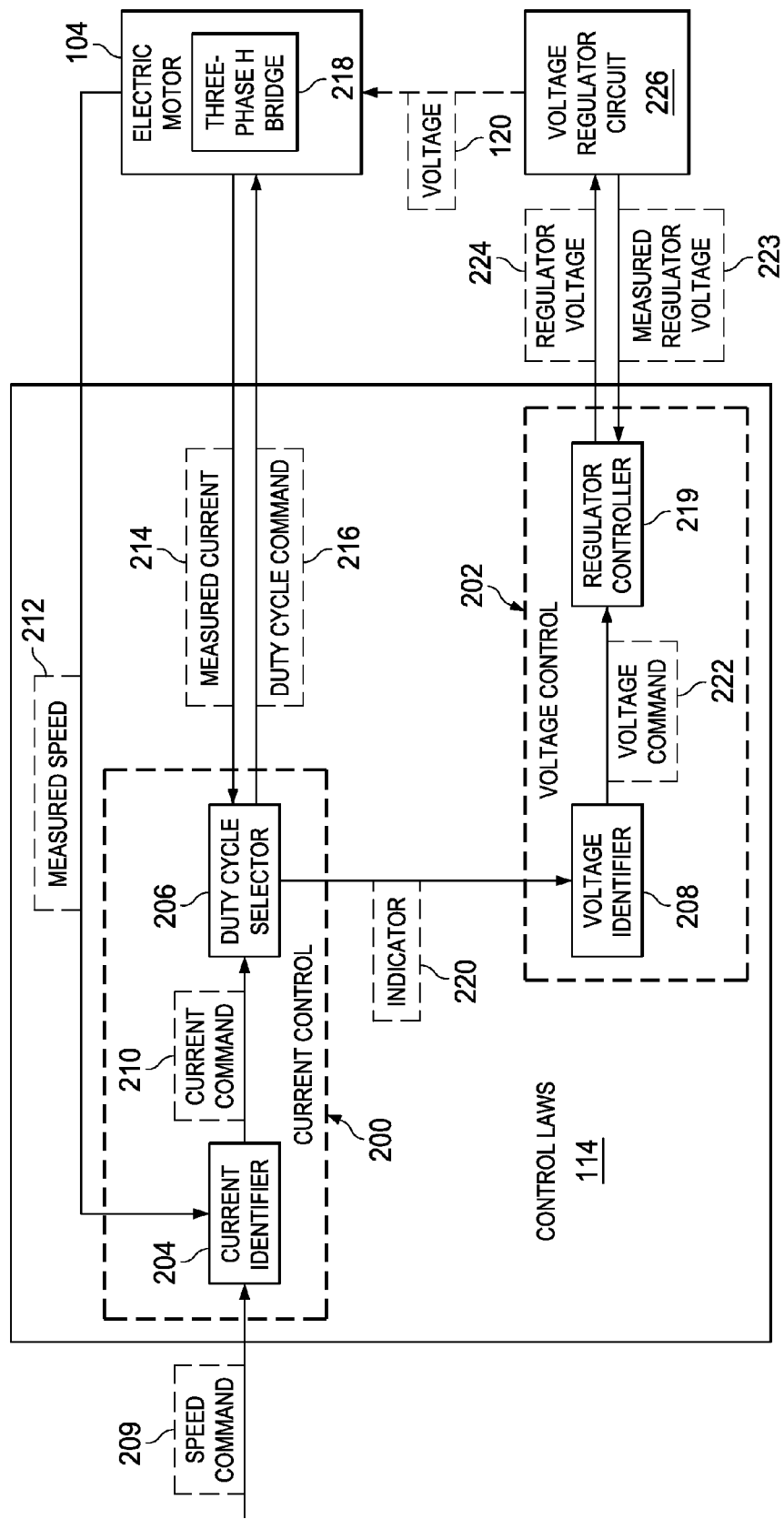
FIG. 2 is an illustration of one implementation of controller for an electric motor system in the form of a block diagram in accordance with an illustrative embodiment.

With reference now to FIG. 2, an illustration of one implementation of a controller for an electric motor system is depicted in the form of a block diagram in accordance with an illustrative embodiment. In this illustrative example, an example of a group of control laws 114 that are configured to control electric motor 104 with a desired level for duty cycle 115 and a desired level for speed 116, as depicted in FIG. 1, are illustrated.

As depicted, the group of control laws 114 includes current control 200 and voltage control 202. Current control 200 is configured to identify and generate a current command which is used to calculate a desired duty cycle for electric motor 104. Voltage control 202 is configured to identify and generate a voltage that is applied to electric motor 104. This voltage is one that causes the electric motor to operate at a desired level for speed 116 with a desired level for duty cycle 115.

In this illustrative example, current control 200 includes current identifier 204 and duty cycle selector 206. Current identifier 204 is a control law that receives speed command 209. Speed command 209 may designate a speed in revolutions per minute (RPM). Speed command 209 may be generated by user input from a human operator, another controller, or some other suitable device.

Current identifier 204 is configured to identify current command 210 using speed command 209. Additionally, current identifier 204 also uses measured speed 212 as feedback from electric motor 104. Measured speed 212 is speed 116 measured for electric motor 104. As depicted, measured speed 212 is a feedback from electric motor 104. Current command 210 indicates the current that should flow through windings in electric motor 104 to cause electric motor 104 to operate at the speed indicated in speed command 209.

As depicted, current command 210 is input into duty cycle selector 206. Duty cycle selector 206 is a control law that is configured to identify a duty cycle for electric motor 104 using measured current 214 for electric motor 104. Measured current 214 is a feedback from measurements made of electric motor 104. Measured current 214 may be used to identify speed 116 for electric motor 104.

In this illustrative example, duty cycle selector 206 identifies and generates duty cycle command 216 as an output using current command 210. In addition, duty cycle selector 206 also receives measured current 214 as a feedback from electric motor 104. Measured current 214 is the current that flows in the windings in electric motor 104.

As depicted, duty cycle command 216 is a command which controls the amount of times switches are closed in three-phase H bridge 218. This command changes the magnitude of the current in the motor windings in electric motor 104. This current control is achieved because the duty cycle determines how long the voltage is applied across the windings in electric motor 104.

Duty cycle command 216 is applied to three-phase H bridge 218 for electric motor 104. In other words, this command is configured to control the amount of time switches are closed in three-phase H bridge 218 and provide duty cycle 115 at the desired level. Duty cycle command 216 may be selected to control duty cycle 115 for electric motor 104 such that duty cycle 115 is about 100 percent or some lower percentage.

For example, if environmental change 118 in FIG. 1 reduces the load on electric motor 104, speed 116 may increase to a greater-than-desired level for speed 116. As a result, duty cycle 115 may be reduced to maintain speed 116 at a desired level. In some cases, the duty cycle may be required to be greater than 100 percent to maintain a desired level for speed 116. In this case, duty cycle command 216 is selected such that the duty cycle stays at about 100 percent. However, other changes may be made to maintain speed 116 at the desired level.

As depicted, voltage control 202 includes voltage identifier 208 and regulator controller 219. In this illustrative example, voltage identifier 208 is configured to adjust the voltage across electric motor 104 to maintain speed 116 at the desired level when duty cycle 115 is already at about 100 percent, or cannot be increased by a desired amount to maintain or change speed 116 to the desired level.

In summary, duty cycle command 216 is limited to setting the duty cycle to a maximum magnitude of 100 percent. That is, in this illustrative example, duty cycle command 216 has a magnitude that is not greater than one in which a +1 sets duty cycle 115 to +100 percent and a −1 sets duty cycle 115 to −100 percent.

In contrast, indicator 220 may have a magnitude that is greater than one. In the illustrative example, indicator 220 is a value that may indicate that duty cycle 115 should have a magnitude greater than 1, although such a situation is not physically possible. As a result, indicator 220 is used to change voltage 120 as applied to electric motor 104. This change may occur while maintaining duty cycle 115 at 100 percent.

Further, if indicator 220 is lower than some selected amount, indicator 220 may be used as a trigger to decrease voltage 120. For example, if duty cycle selector 206 identifies that duty cycle 115 should be at 90 percent, voltage 120 may be reduced instead to maintain duty cycle 115 at 90 percent or some other threshold level. In this manner, duty cycle 115 may be maintained at or within some threshold range of 100 percent.

As depicted, voltage identifier 208 is a control law and is configured to receive indicator 220 as an input. Indicator 220 indicates whether a voltage change is needed. In other words, if duty cycle 115 identified by duty cycle selector 206 is greater than 100 percent for electric motor 104, indicator 220 indicates the presence of this condition. For example, indicator 220 may have a value of 1 when duty cycle 115 is substantially 100 percent. As another example, indicator 220 may have a value of 1.1 if duty cycle 115 is identified as substantially 110 percent.

In the illustrative example, indicator 220 is used by voltage identifier 208 to identify voltage command 222. Voltage command 222 is the voltage that should be applied to electric motor 104. This voltage is the voltage used with the duty cycle set using duty cycle command 216 for electric motor 104. Voltage command 222 may change the voltage applied to electric motor 104 to maintain a desired level for speed 116 while maintaining a duty cycle of substantially 100 percent in these illustrative examples. In this manner, a desired level of efficiency may be maintained in operating electric motor 104.

Regulator controller 219 receives voltage command 222 from voltage identifier 208. In this illustrative example, regulator controller 219 also uses measured regulator voltage 223 as a feedback from voltage regulator circuit 226.

Regulator controller 219 is a control law that controls the operation of voltage regulator circuit 226. Voltage regulator circuit 226 is a direct current (DC) voltage to direct current (DC) voltage converter in these illustrative examples. As depicted, regulator controller 219 applies regulator voltage 224 to voltage regulator circuit 226 such that voltage 120 is applied to electric motor 104. Voltage 120 is the voltage that is desired for electric motor 104 to reach or maintain a desired level for speed 116. Reaching the desired level for speed 116 may include increasing or decreasing speed 116.

In this manner, controller 108 may control the operation of electric motor 104 with a desired level of efficiency. As described above, controller 108 with control laws 114 is configured to control at least one of duty cycle 115 and voltage 120 for electric motor 104.

The illustration of electric motor environment 100 and the different components in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 108 may be configured to control one or more electric motors in addition to electric motor 104. Further, controller 108 may take other forms other than an impulse width modulation controller. For example, controller 108 also may be a pulse width modulation controller in some illustrative examples. As another example, although three-phase H bridge 218 is illustrated as providing switching for duty cycle 115 in electric motor 104, other types of circuits may be used. For example, a multi-phase motor, including a number other than three, is included.

The illustration of group of control laws 114 in FIG. 2 is only provided as one manner in which the group of control laws 114 may be implemented. The different functions illustrated in the different control laws may be combined together in fewer functional blocks or divided into greater functional blocks depending on the particular implementation.

Further, electric motor 104 may be configured differently from the illustration in FIG. 2. For example, other numbers of phases may be present and other types of circuits may be used in place of three-phase H bridge 218 in electric motor 104 depending on the particular implementation.

In these illustrative examples, the different commands generated may take different forms depending on implementation of the group of control laws 114. For example, if the group of control laws 114 are implemented in software, these commands may be data such as values. If the group of control laws 114 are implemented using hardware, these commands may be electrical signals in which the voltages of those electrical signals identify different values.

In another illustrative example, regulator controller 219 and voltage regulator circuit 226 may be omitted. In this example, voltage identifier 208 may generate voltage 120 rather than voltage command 222.

Further, although not shown, the different measured parameters, such as measured speed 212, measured current 214, and measured regulator voltage 223, as well as other parameters, may be measured using sensors not shown in electric motor system 102. The sensors may be selected from at least one of a current sensor, a voltage sensor, an encoder, or other suitable devices. In some cases, these parameters may be inferred indirectly. For example, measured speed 212 may be identified from measured current 214.

Figure 3:
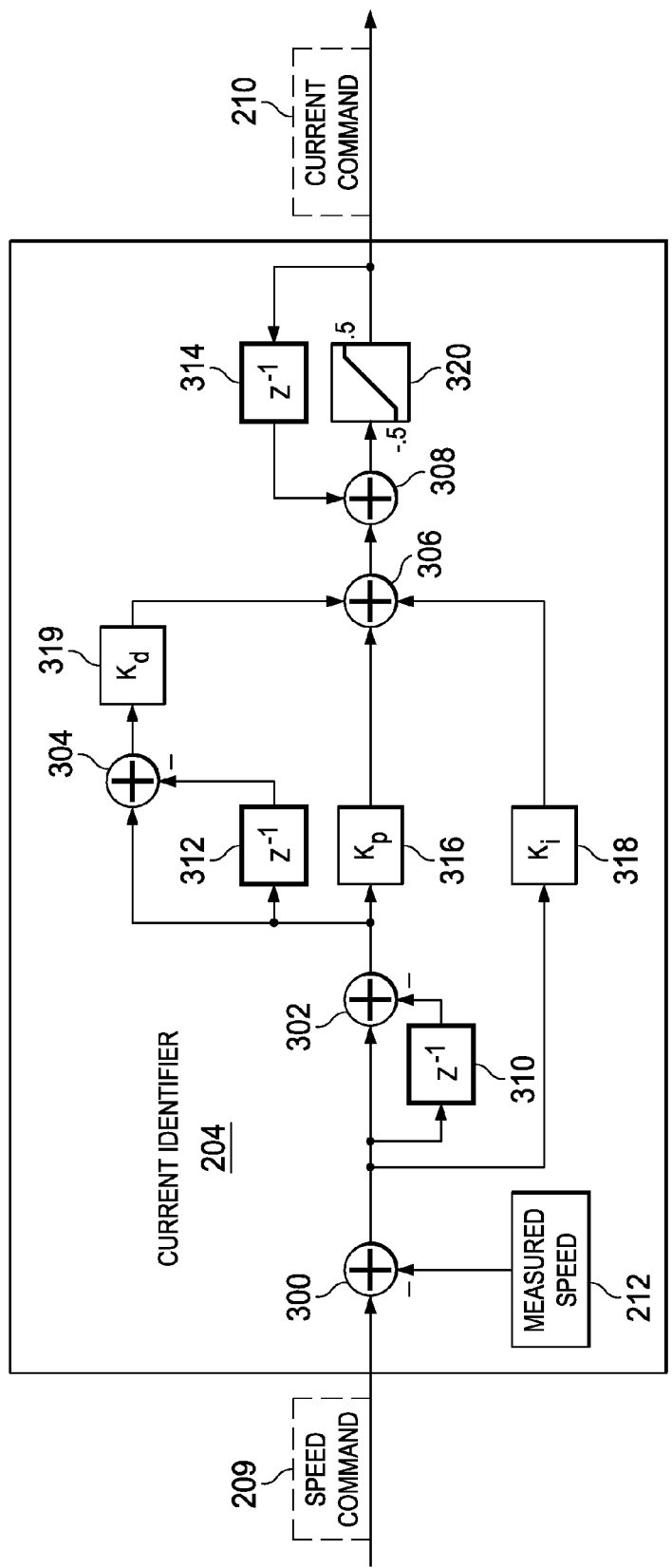
FIG. 3 is an illustration of a current identifier in accordance with an illustrative embodiment.

FIGS. 3-6 are examples of implementations for the control laws illustrated in FIG. 2. With reference first to FIG. 3, an illustration of a current identifier is depicted in accordance with an illustrative embodiment. In this illustrative example, one implementation of current identifier 204 in FIG. 2 is shown. As depicted, current identifier 204 receives speed command 209 as an input and generates current command 210 as an output. Current command 210 identifies the current needed to flow through the windings in electric motor 104 for the speed identified in speed command 209.

As depicted, current identifier 204 includes a number of different components. In this illustrative example, current identifier 204 includes summing block 300, summing block 302, summing block 304, summing block 306, summing block 308, derivative block 310, derivative block 312, integrator block 314, gain constant 316, gain constant 318, gain constant 319, and limiter 320.

This configuration of components in current identifier 204 identifies current command 210 from speed command 209. In this illustrative example, these components form a proportional-integral-derivative (PID) controller. In other words, the components calculate an error value as the difference between a measured speed of electric motor 104 and the desired speed in speed command 209. This error value is then multiplied by a gain and summed together which is integrated, thus providing the output.

As part of the process, measured speed 212 is used to identify current command 210. Measured speed 212 is a feedback signal representing the measured speed of electric motor 104. Measured speed 212 is subtracted from the desired speed in speed command 209 at summing block 300. These different speeds may be represented as voltages and signals that are subtracted at summing block 300.

Thus, if measured speed 212 of electric motor 104 is the same as the desired speed in speed command 209, then the output of summing block 300 is zero and no change is made in current command 210. If the error is zero, or very close to zero, when multiplied by the gains, the integrated result will provide a small correction to the system. In other words, the output, current command 210, of current identifier 204 will be proportionally close to zero as well.

In this particular example, limiter 320 is configured to limit current command 210 between about −0.5 and about 0.5. As depicted, limiter 320 prevents the current in the windings of electric motor 104 from passing a minimum or maximum value. This value depends on the limitations of the components in the circuit and is not constrained in value. In one illustrative example, the values of about +0.5 and about −0.5 are normalized with respect to about 100 amperes. This number may be chosen arbitrarily. The maximum limited current may be expressed as follows: 100 A*0.5=50 A.

Figure 4:
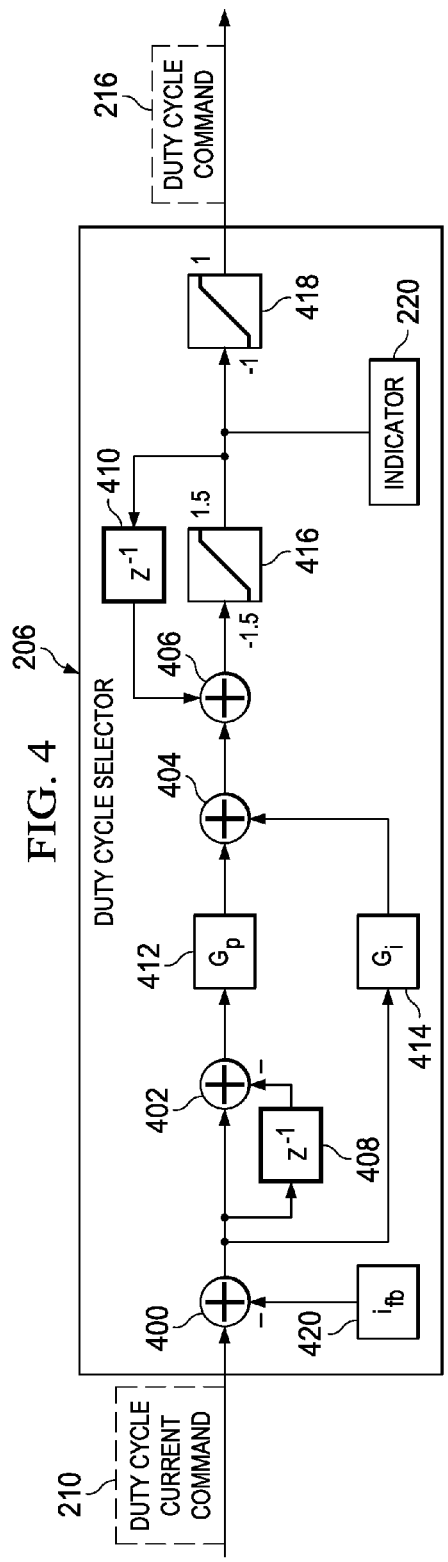
FIG. 4 is an illustration of a duty cycle selector in accordance with an illustrative embodiment.

Turning next to FIG. 4, an illustration of a duty cycle selector is depicted in accordance with an illustrative embodiment. In this illustrative example, one implementation of duty cycle selector 206 in FIG. 2 is shown. As depicted, duty cycle selector 206 receives current command 210 as an input and generates duty cycle command 216 and indicator 220 as an output.

As depicted, duty cycle selector 206 includes a number of different components. In this illustrative example, duty cycle selector 206 includes summing block 400, summing block 402, summing block 404, summing block 406, derivative block 408, integrator block 410, gain constant 412, gain constant 414, limiter 416, and limiter 418. In this illustrative example, these components form a proportional-integral-derivative (PID) controller.

As depicted, limiter 416 is used to limit the output of summing block 406. The signal coming out of summing block 406 is the resulting duty cycle for the electric motor. The first limiter block, limiter 416, limits the duty cycle identified to a value that may be greater than 1. These values may be symmetric. Further, limiter 416 has values that are larger in magnitude than 1. The output of limiter 416 is configured to be indicator 220 and is a signal used to drive the voltage command up.

This value from summing block 406 is limited using limiter 416 to ensure the output is not larger than desired. In this illustrative example, the value 1.5 was selected as the upper value because a +50 percent duty cycle command was selected as a desirable limit. This value can be a value of anything larger than 1. For example, the value may have a magnitude of 1.25, 2, 2.4, or any other desirable value.

This control law uses current command 210 to calculate the duty cycle needed to drive electric motor 104 at the desired speed indicated in speed command 209. In this particular example, indicator 220 is generated before a final limit is applied by limiter 418.

Limiter 418 limits duty cycle command 216 to a value from about −1 to about 1. In this illustrative example, −1 represents a duty cycle of about −100 percent while 1 represents a duty cycle of about 100 percent. Limiter 418 constrains the motor duty cycle to a maximum of 100 percent. In the illustrative example, driving electric motor 104 with duty cycle 115 larger than 100 percent is physically meaningless.

On the other hand, the value for indicator 220 is not limited to a value from about −1 to about 1. As a result, indicator 220 may indicate whether a duty cycle of greater than 100 percent or minus 100 percent is needed. This indication may be used to identify an amount of voltage adjustment. As described above, this voltage adjustment is identified by voltage identifier 208.

In duty cycle selector 206, measured current 420 is the current measured in the windings of the motor. Measured current 420 is used as a feedback into duty cycle selector 206. Measured current 420 is subtracted from the value of the current commanded by current command 210. In the illustrative example, the difference in the feedback and commanded signal creates an "error" of "delta" signal. This error is then multiplied by gains and summed to provide a corrective output in the form of duty cycle command 216.

The different components in duty cycle selector 206 are configured to detect whether the current voltage setting for electric motor 104 is inadequate to drive electric motor 104 at the current conditions. These conditions include the desired speed, load on the motor, and other suitable conditions. This indication is provided by indicator 220. In other words, if indicator 220 is greater than 1, then the duty cycle needed is higher than realistically possible for electric motor 104.

Different components in duty cycle selector 206 also are configured to protect electric motor 104 from a sudden surge in current command 210. The sudden surge may occur when electric motor 104 accelerates from a dormant state. In other words, duty cycle selector 206 may allow electric motor 104 to start from a stopped condition.

Figure 5:
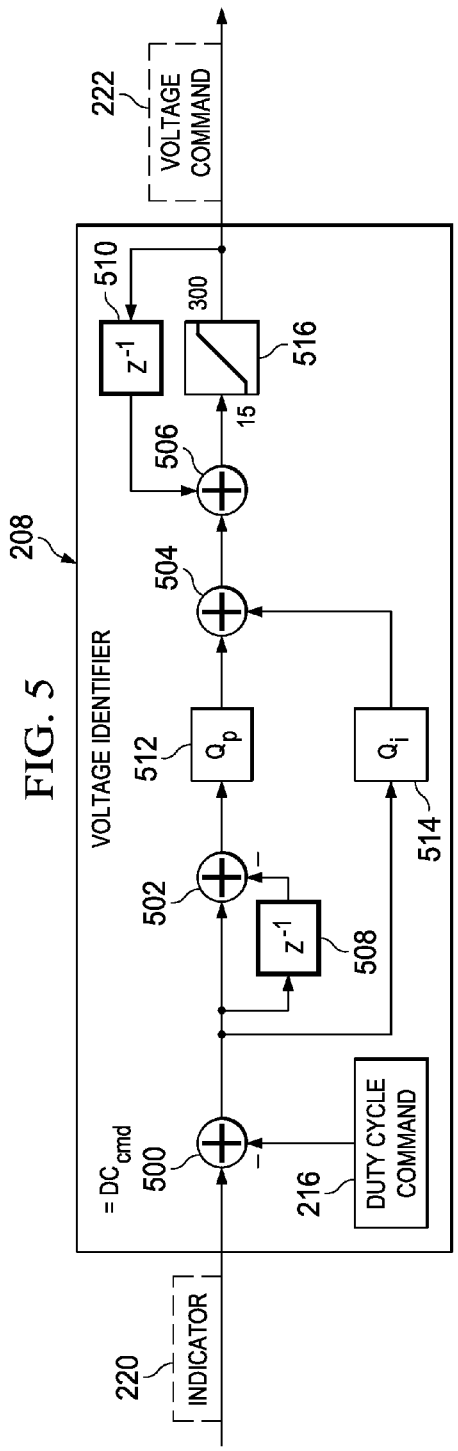
FIG. 5 is an illustration of a voltage identifier in accordance with an illustrative embodiment.

With reference now to FIG. 5, an illustration of a voltage identifier is depicted in accordance with an illustrative embodiment. In this illustrative example, one implementation of voltage identifier 208 in FIG. 2 is shown. As depicted, voltage identifier 208 receives indicator 220 as an input and generates voltage command 222 as an output. As depicted, voltage identifier 208 includes a number of different components. In this illustrative example, voltage identifier 208 includes summing block 500, summing block 502, summing block 504, summing block 506, derivative block 508, integrator block 510, gain constant 512, gain constant 514, and limiter 516. In this illustrative example, these components form a proportional-integral-derivative (PID) controller.

Voltage identifier 208 is configured to identify voltage command 222 that is used to cause electric motor 104 to operate at a desired level of speed 116 with the level selected for duty cycle 115 by duty cycle selector 206. Voltage identifier 208 also receives feedback in the form of duty cycle command 216. Duty cycle command 216 is subtracted from indicator 220 at summing block 500. This result provides an error value used within voltage identifier 208 to generate voltage command 222. When duty cycle command 216 is less than 1, the error value right after summing the feedback in indicator 220 in voltage identifier will be zero. However, in this illustrative example, if indicator 220 has a value that is greater than 1, the error generated at summing block 500 is the difference in indicator 220 and duty cycle command 216. This "feedback" value is different as it is just the duty cycle command sent to electric motor 104 in the previous step. When a non-zero error value is present, the voltage will be commanded to change in voltage command 222.

In this illustrative example, the non-limited duty cycle as indicated by indicator 220 is used to determine voltage command 222. As described above, indicator 220 may be greater than 1 or less than −1.

When indicator 220 is greater than 1 or less than −1, indicator 220 indicates that the level of voltage 120 currently used to drive electric motor 104 is inadequate.

When indicator 220 is greater than 1 or less than −1, this difference is used to generate a change in voltage 120 applied to electric motor 104 to take into account the limit on duty cycle 115 in a manner that provides speed 116 for electric motor 104 at a desired level.

Figure 6:
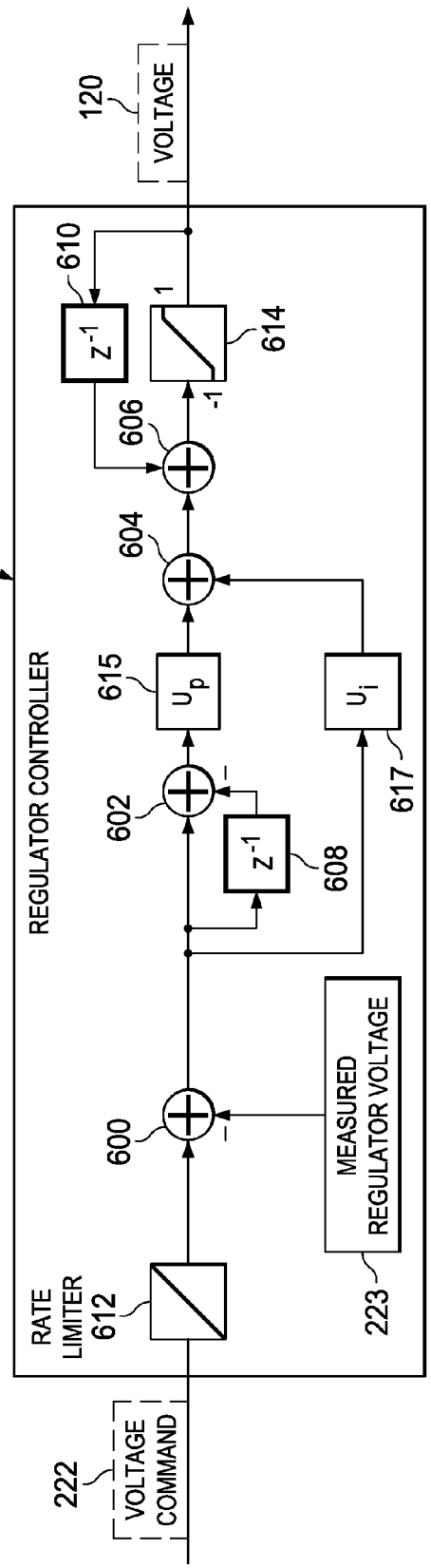
FIG. 6 is an illustration of a regulator controller in accordance with an illustrative embodiment.

With reference now to FIG. 6, an illustration of a regulator controller is depicted in accordance with an illustrative embodiment. In this illustrative example, one implementation of regulator controller 219 in FIG. 2 is shown. As depicted, regulator controller 219 receives voltage command 222 as an input and generates voltage 120 as an output. Voltage command 222 is configured to control voltage regulator circuit 226. This control of voltage regulator circuit 226 applies voltage 120 across electric motor 104 such that speed 116 of electric motor 104 has a desired level in view of the current level of duty cycle 115 as controlled through duty cycle command 216.

As depicted, regulator controller 219 includes a number of different components. In this illustrative example, regulator controller 219 includes summing block 600, summing block 602, summing block 604, summing block 606, derivative block 608, integrator block 610, rate limiter 612, limiter 614, gain constant 615, and gain constant 617. In this illustrative example, these components form a proportional-integral-derivative (PID) controller.

Regulator controller 219 is configured to generate regulator voltage 224 in a manner that controls voltage regulator circuit 226 to apply voltage 120 across three-phase H bridge 218 of electric motor 104 to achieve the desired level for voltage 120 across electric motor 104. In this illustrative example, regulator voltage 224 controls switches within voltage regulator circuit 226 to cause regulator voltage 224 to generate voltage 120 at a desired level.

As depicted, summing block 600 receives voltage command 222. Summing block 600 also receives measured regulator voltage 223 and subtracts this value from voltage command 222.

In this illustrative example, rate limiter 612 is then configured to prevent the voltage across the three-phase H bridge from increasing more quickly than desired. Rate limiter 612 limits the rate of change while limiter 614 limits the value of the output, voltage 120. In this case, rate limiter 612 is implemented to ensure that voltage 120 does not increase more quickly than desired.

In particular, regulator voltage 224 is configured to drive voltage regulator circuit 226 with a duty cycle that generates a desired level for voltage 120. This duty cycle is different from duty cycle 115 for electric motor 104.

The illustrations of the different control laws in FIGS. 3-6 are meant as examples of implementations of control laws 114 in FIG. 1 and FIG. 2 and are not meant to limit the manner in which these control laws may be implemented. The different logic blocks illustrated may be implemented in software, hardware, or some combination thereof.

Figure 7:
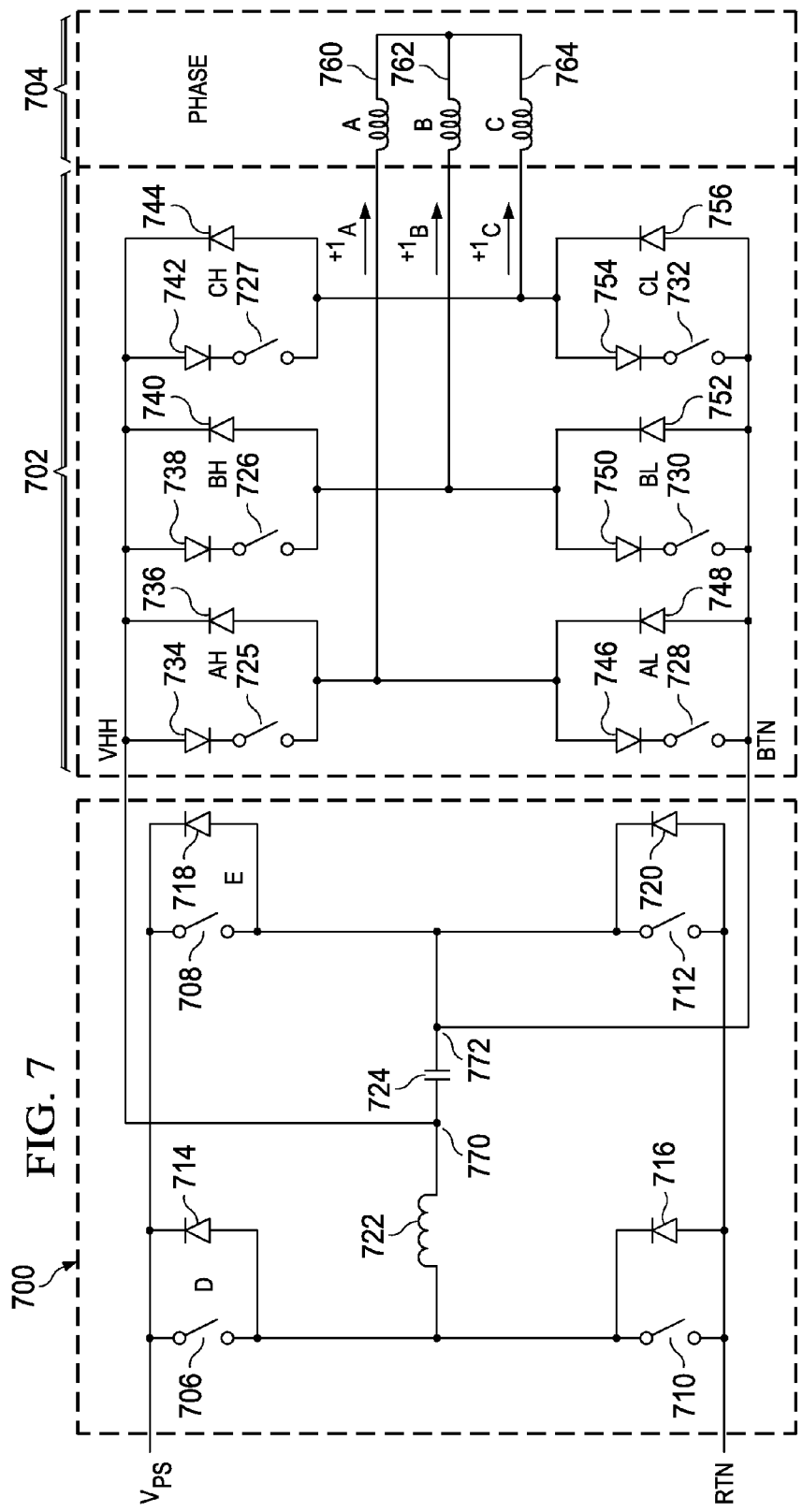
FIG. 7 is an illustration of a regulator voltage circuit and a three-phase H bridge in accordance with an illustrative embodiment.

Turning now to FIG. 7, an illustration of a regulator voltage circuit and a three-phase H bridge is depicted in accordance with an illustrative embodiment. In this illustrative example, voltage regulator circuit 700 is an example of one implementation for voltage regulator circuit 226 shown in block form in FIG. 2. In this example, voltage regulator circuit 700 is an H bridge circuit. As depicted, three-phase H bridge 702 is an example of an implementation for three-phase H bridge 218 shown in block form in FIG. 2. Motor windings 704 are examples of motor windings in electric motor 104.

In this illustrative example, voltage regulator circuit 700 includes switch 706, switch 708, switch 710, switch 712, diode 714, diode 716, diode 718, diode 720, inductor 722, and capacitor 724. Three-phase H bridge 702 includes switch 725, switch 726, switch 727, switch 728, switch 730, switch 732, diode 734, diode 736, diode 738, diode 740, diode 742, diode 744, diode 746, diode 748, diode 750, diode 752, diode 754, and diode 756. These different components may be implemented using semiconductors in the illustrative examples.

Motor windings 704 include winding 760, winding 762, and winding 764. Of course, although three windings for three phases are shown in this example, other numbers of windings in phases may be implemented depending on the particular example. For example, 2 windings, 4 windings, or some other number of windings may be used with two phases, four phases, or some other number of phases.

As depicted, voltage $V_{ps}$ is an upper voltage and voltage RTN is a lower voltage relative to each other. Voltage $V_{ps}$ may be set using regulator voltage 224 in voltage regulator circuit 700.

The application of voltage $V_{ps}$ is such that the voltage across capacitor 724 is the same as voltage 120 in this illustrative example. The connections to three-phase H bridge 702 at point 770 and point 772 result in voltage 120 across capacitor 724 also being applied to three-phase H bridge 702.

In these illustrative examples, duty cycle command 216 may be used to control how long the different switches in three-phase H bridge 702 are closed relative to the total pulse width modulation of time in this illustrative example. By changing the duty cycle, the magnitude of the current may be controlled in winding 760, winding 762, and winding 764.

In these illustrative examples, voltage regulator circuit 700 may be used to reduce voltage and current spikes that may occur in the system. Further, voltage regulator circuit 700 in this illustrative example may be used to achieve smoother control and smaller current and voltage ripples compared to configurations of electric motor systems that do not use three-phase H bridge 702.

Figure 8:
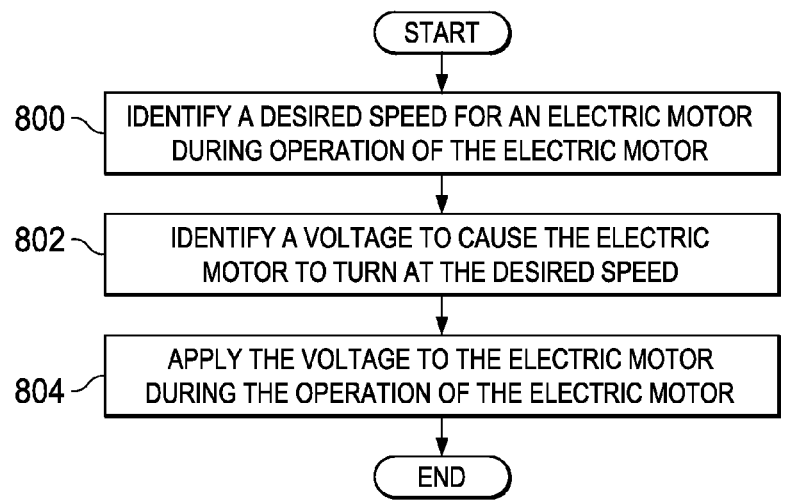
FIG. 8 is an illustration of a flowchart of a process for controlling electric motors in accordance with an illustrative embodiment.

With reference now to FIG. 8, an illustration of a flowchart of a process for controlling electric motors is depicted in accordance with an illustrative embodiment. The different operations in FIG. 8 may be implemented in electric motor environment 100 in FIG. 1. In particular, the operations may be implemented using controller 108 within electric motor system 102 in FIG. 1.

The process begins by identifying a desired speed for an electric motor during operation of the electric motor (operation 800). The process then identifies a voltage to cause the electric motor to turn at the desired speed (operation 802). The process then applies the voltage to the electric motor during the operation of the electric motor (operation 804), with the process terminating thereafter. These operations may be repeated to maintain a current speed of the electric motor at the desired speed in response to changes in loading on the electric motor.

The different operations illustrated in FIG. 8 may be implemented to maintain the speed of the electric motor at a desired level during operation of the electric motor. With controller 108 in FIG. 1, electric motors with programmed speeds where the speeds of the electric motors change in response to inputs may be controlled to reach those different speeds desired while maintaining a duty cycle at a desired level such as about 100 percent.

For example, an electric motor used to move air in an environmental system may be controlled to have different speeds. Different speeds may be desirable depending on the airflow desired within the environmental system. With controller 108, those speeds may be maintained with a desired level of controllability in view of environmental changes that may change the loading on the electric motor. Of course, controller 108 may be applied to many other types of applications in which the speed of the electric motor may change during operation of the electric motor due to a program or input in addition to when the electric motor maintains a constant speed.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
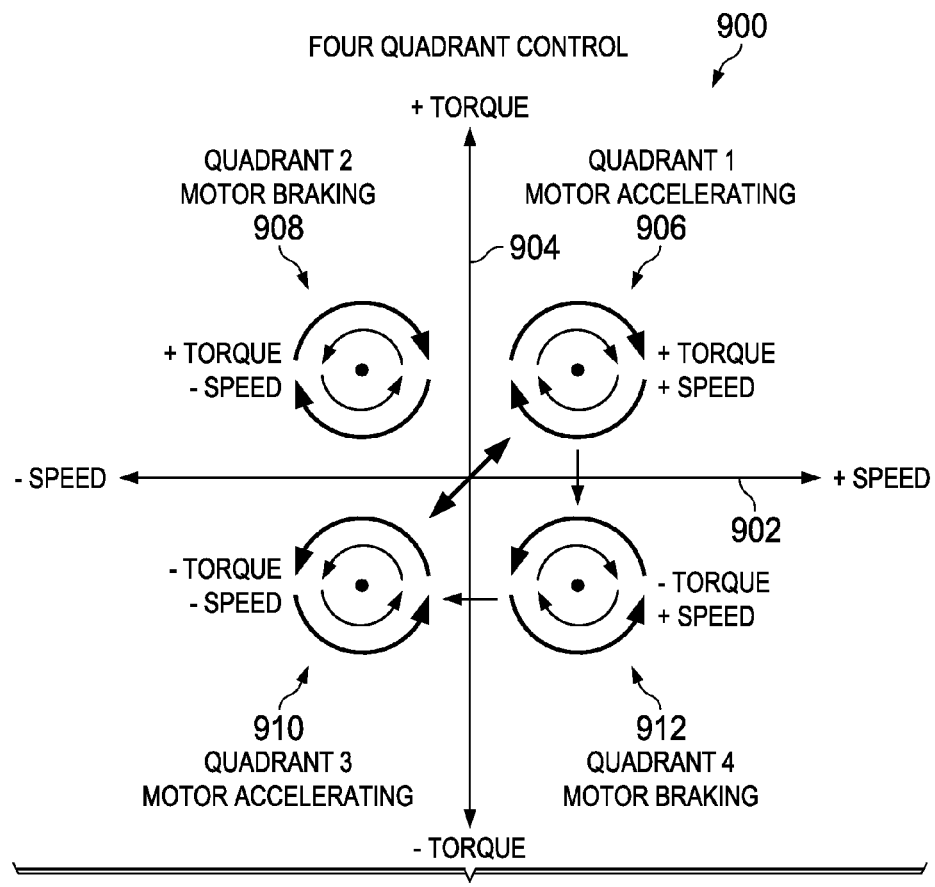
FIG. 9 is an illustration of four quadrant control in accordance with an illustrative embodiment.

With reference now to FIG. 9, an illustration of four quadrant control is depicted in accordance with an illustrative embodiment. In this illustrative example, electric motor system 102 in FIG. 1 may be used in multiple instances. In particular, controller 108 may be used to control electric motor 104 to operate in the four quadrants as illustrated by graph 900. Controller 108 is configured to control operation of electric motor 104 in one or more of the four quadrants illustrated in graph 900.

As depicted, graph 900 illustrates torque versus speed. X-axis 902 represents speed. Y-axis 904 represents torque. In this illustrative example, first quadrant 906, second quadrant 908, third quadrant 910, and fourth quadrant 912 are illustrated. First quadrant 906 represents acceleration of the motor in which speed is in a first direction with torque in a first direction. Second quadrant 908 represents motor braking in which torque is in the reverse direction while speed is in the forward direction. Third quadrant 910 represents acceleration of the motor with torque in a second direction and speed in a second direction. Fourth quadrant 912 represents braking of the motor running in reverse. In this quadrant, the speed is in the reverse direction while the torque is in the forward direction.

In an illustrative example, active control of the voltage is applied to the motor windings during the four quadrant operations. The motor current in the windings also may be controlled with the applied voltage being controlled to accommodate a duty cycle of about 100 percent.

Figure 10:
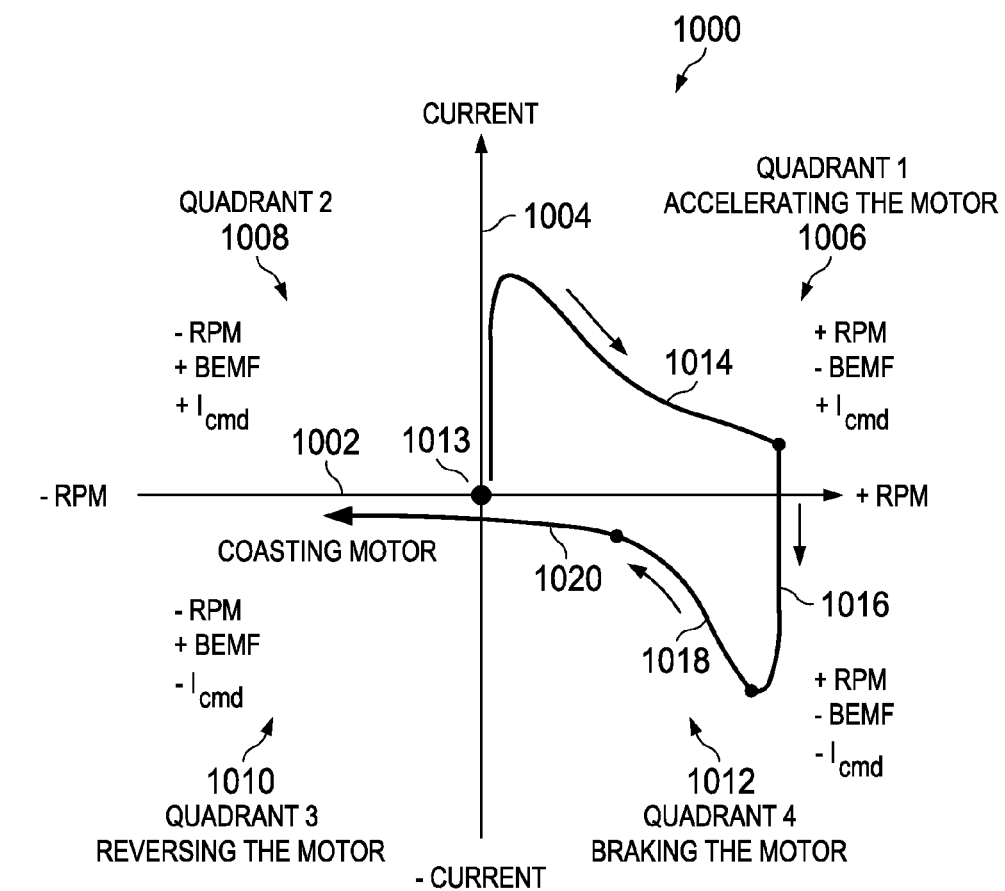
FIG. 10 is an illustration of a graph of an electric motor operating in four quadrants in accordance with an illustrative embodiment.

With reference now to FIG. 10, an illustration of a graph of an electric motor operating in four quadrants is depicted in accordance with an illustrative embodiment. Graph 1000 illustrates an example of a trajectory of an electric motor through four quadrants as shown in FIG. 9 during operation of the electric motor. In this illustrative example, graph 1000 illustrates the operation of an electric motor with respect to speed and current. In this example, X-axis 1002 represents speed in revolutions per minute (RPM). Y-axis 1004 represents current. The current may be a representation of a parameter such as torque.

In this illustrative example, graph 1000 includes four quadrants. These quadrants are quadrant 1 1006, quadrant 2 1008, quadrant 3 1010, and quadrant 4 1012. In quadrant 1 1006, the speed of the electric motor is positive, current command to the electric motor is positive, and backward electromotive force (BEMF) for the electric motor is negative. Backward electromotive motor force is of a voltage that is generated in the opposite direction of the current flowing in the windings of an electric motor. In quadrant 2 1008, the speed is negative, the current command is positive, and the backward electromotive force is positive. In quadrant 3 1010, the speed is negative, the current command is negative, and the backward electromotive force is positive. In quadrant 4 1012, the speed is positive, the current command is negative, and the backward electromotive force is negative.

The operation of the electric motor begins at origin 1013 with the electric motor at rest. In this illustrative example, line 1014 represents the operation of an electric motor moving in a forward direction in quadrant 1 1006. Line 1016 represents a change in the operation of the electric motor. In line 1016, the electric motor changes from accelerating to braking in quadrant 4 1012. In quadrant 4 1012, the torque is in a negative direction while the speed is in a positive direction. Line 1018 represents braking of the electric motor in quadrant 4 1012. Line 1020 represents the motor stopping and accelerating in a reverse direction, and then coasting in quadrant 3 1010.

In these illustrative examples, the type of operation illustrated in graph 1000 may be performed with a duty cycle that is about 100 percent in all four quadrants in which the electric motor may be operated. In this manner, the operation of the electric motor may be smoother, more efficient, and more easily controlled as compared to currently used electric motor systems.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in the form of a block diagram in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in the form of a block diagram in which an illustrative embodiment may be implemented. In this example, aircraft 1200 is produced by aircraft manufacturing and service method 1100 in FIG. 11 and may include airframe 1202 with systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. For example, electric motor systems may be manufactured for use in aircraft during one or more of these different stages.

As yet another example, one or more apparatus embodiments, method embodiments, or a combination thereof may be utilized during production stages, such as component and subassembly manufacturing 1106 and system integration 1108 in FIG. 11. As another example, during in service 1112, one or more illustrative embodiments may be implemented to control the operation of electric motors in a manner that increases the efficiency of electric motors. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

Thus, in the illustrative examples, electric motor system 102 with controller 108 may provide an ability to operate at a sweet spot, such as substantially 100 percent duty cycle. Further, controller 108 is configured to provide a desired controllability of electric motor 104 through the adjustment of voltage 120 maintaining duty cycle 115 at a desired level, such as substantially 100 percent. Duty cycle 115 at this desired level may be referred to as a desired duty cycle. In this manner, the level of the sufficiency with respect to electrical power input into electric motor 104 and mechanical power in the form of rotation may be maintained at higher levels than with currently used electric motors.

As described above, the controllability is provided even when the duty cycle is substantially 100 percent through the regulation of the voltage used to operate electric motor 104.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The course although different examples have been described with respect using electric motors in aircraft, the illustrative embodiments may be implemented for electric motors used in other applications. For example, electric motors in accordance with an illustrative embodiment may be implemented in manufacturing tools, automobiles, a spacecraft, satellites, trains, appliances, and other suitable objects. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a controller configured
to identify a desired speed for an electric motor during operation of the electric motor;
to identify a duty cycle for the desired speed;
to identify a voltage to cause the electric motor to turn at the desired speed based on the duty cycle identified for the desired speed;
to generate the duty cycle as a duty cycle command for the electric motor;
to generate a voltage command based on the duty cycle command;
to generate the voltage as a regulator voltage for a voltage regulator circuit based on the voltage command; and
to apply the voltage to the electric motor during operation of the electric motor.

2. The apparatus of claim 1,
wherein the controller is further configured
to identify the desired speed for the electric motor during operation of the electric motor;
to identify the voltage to cause the electric motor to turn at the desired speed; and
to apply the voltage to the electric motor during operation of the electric motor repeatedly in response to changes in loading on the electric motor.

3. The apparatus of claim 1, wherein in being configured to identify the desired speed for the electric motor during operation of the electric motor, the controller is configured to receive the desired speed for the electric motor from one of a user input and a device.

4. The apparatus of claim 1, wherein the controller is configured to identify the voltage to cause the electric motor to turn at the desired speed using a group of control laws.

5. The apparatus of claim 4, wherein the group of control laws comprises a current identifier, a duty cycle selector, a voltage identifier, and a regulator controller.

6. The apparatus of claim 4, wherein a control law in the group of control laws includes a proportional-integral-derivative controller.

7. The apparatus of claim 1, wherein the controller is configured to control operation of the electric motor in four quadrants.

8. The apparatus of claim 1, wherein the voltage to cause the electric motor to turn at the desired speed is identified while maintaining a duty cycle at substantially 100 percent.

9. The apparatus of claim 1,
wherein the controller comprises a voltage identifier configured to adjust the voltage across the electric motor to maintain a speed of the electric motor at the desired speed when the duty cycle is at about 100 percent; and
wherein the electric motor is a brushless electric motor.

10. The apparatus of claim 1,
wherein the controller is further configured
to generate a current command based on a speed command for the electric motor and a measured speed of the electric motor;
to generate the duty cycle as the duty cycle command for the electric motor and an indicator, the duty cycle command and the indicator based on a measured current of the electric motor subtracted from the current command;
to generate the voltage command based on the duty cycle command subtracted from the indicator; and
to generate the voltage as the regulator voltage for the voltage regulator circuit, the regulator voltage based on a measured regulator voltage from the voltage regulator circuit subtracted from the voltage command that is limited by a first rate limiter;
wherein the electric motor receives the duty cycle command from the controller and receives the voltage from the voltage regulator circuit;
wherein the first rate limiter limits the voltage command to prevent the voltage across a three-phase H bridge of the electric motor from increasing more quickly than desired; and
wherein a second rate limiter limits a value of the regulator voltage.

11. An electric motor system comprising:
an electric motor; and
a controller configured
to identify a desired speed for the electric motor during operation of the electric motor;
to identify a duty cycle for the desired speed;
to identify a voltage to cause the electric motor to turn at the desired speed with the duty cycle being about 100 percent using a group of control laws based on the duty cycle identified for the desired speed;
to generate the duty cycle as a duty cycle command for the electric motor;
to generate a voltage command based on the duty cycle command;
to generate the voltage as a regulator voltage for a voltage regulator circuit based on the voltage command; and
to apply the voltage to the electric motor during operation of the electric motor with the duty cycle through the voltage regulator circuit.

12. The electric motor of claim 11, wherein the group of control laws comprises a current identifier, a duty cycle selector, a voltage identifier, and a regulator controller.

13. A method for controlling an electric motor, the method comprising:
  identifying a desired speed for the electric motor during operation of the electric motor;
  identifying a duty cycle for the desired speed;
  identifying a voltage to cause the electric motor to turn at the desired speed based on the duty cycle identified for the desired speed;
  generating the duty cycle as a duty cycle command for the electric motor;
  generating a voltage command based on the duty cycle command;
  generating the voltage as a regulator voltage for a voltage regulator circuit based on the voltage command; and
  applying the voltage to the electric motor during operation of the electric motor.

14. The method of claim 13 further comprising:
  repeating the identifying steps and the applying step to maintain a current speed of the electric motor at the desired speed in response to changes in loading on the electric motor.

15. The method of claim 13, wherein identifying the desired speed for the electric motor during operation of the electric motor comprises:
  receiving the desired speed for the electric motor from one of a user input and a device.

16. The method of claim 13, wherein identifying the voltage to cause the electric motor to turn at the desired speed comprises:
  identifying the voltage to cause the electric motor to turn at the desired speed using a group of control laws.

17. The method of claim 16, wherein the group of control laws comprises a current identifier, a duty cycle selector, a voltage identifier, and a regulator controller.

18. The method of claim 17, wherein a control law in the group of control laws includes a proportional-integral-derivative controller.

19. The method of claim 13, wherein a controller is configured to control operation of the electric motor in four quadrants.

20. The method of claim 13, wherein the voltage to cause the electric motor to turn at the desired speed is identified while maintaining a duty cycle at substantially 100 percent.

* * * * *